United States Patent [19]
Williams

[11] Patent Number: 4,815,289
[45] Date of Patent: Mar. 28, 1989

[54] VARIABLE PRESSURE CONTROL

[75] Inventor: Keith R. Williams, Nevada, Iowa

[73] Assignee: Sundstrand Corporation, Rockford, Ill.

[21] Appl. No.: 507,512

[22] Filed: Jun. 24, 1983

[51] Int. Cl.⁴ ............................................. F16D 31/02
[52] U.S. Cl. ........................................ 60/327; 60/443; 60/452; 417/217; 417/222
[58] Field of Search ................ 60/327, 443, 444, 452, 60/447; 417/212, 217, 218, 222, 53

[56] References Cited

U.S. PATENT DOCUMENTS

| | | | |
|---|---|---|---|
| 1,974,138 | 9/1934 | Ferris et al. | 417/217 |
| 3,187,509 | 6/1965 | Moon, Jr. | 60/389 |
| 3,365,886 | 1/1968 | Moon, Jr. | 60/443 |
| 3,553,962 | 1/1971 | Potter et al. | 60/389 |
| 3,637,327 | 1/1972 | Kubiak | 417/222 |
| 3,659,963 | 5/1972 | Jennings | 417/213 |
| 3,733,970 | 5/1973 | Bosch | 417/217 X |
| 3,915,253 | 10/1975 | Ott et al. | 60/452 X |
| 3,999,387 | 12/1976 | Knopf | 60/444 |
| 4,028,890 | 6/1977 | Habiger et al. | 60/443 |
| 4,074,529 | 2/1978 | Budzich | 60/445 |
| 4,075,841 | 2/1978 | Hamma et al. | 60/444 |
| 4,124,333 | 11/1978 | Liesener | 60/452 X |
| 4,216,656 | 8/1980 | Hamma | 60/447 X |
| 4,282,711 | 8/1981 | Branstetter | 60/444 X |
| 4,336,003 | 6/1982 | Kramer et al. | 417/217 |
| 4,355,506 | 10/1982 | Leonard | 60/443 X |
| 4,381,647 | 5/1983 | Ruseff | 417/222 X |
| 4,420,935 | 12/1983 | Kobald | 60/452 X |

FOREIGN PATENT DOCUMENTS 54982  5/1981  Japan .................................. 417/222

OTHER PUBLICATIONS

Publication of Hydraulics, Inc. entitled Torque Control for Port "A" & B, Nov. 1983.

*Primary Examiner*—Edward K. Look
*Attorney, Agent, or Firm*—Wood, Dalton, Phillips, Mason & Rowe

[57] ABSTRACT

A variable pressure control for controlling displacement of a variable displacement over-center pump utilizes a pair of remotely variable pressure limiter three-way valves which are associated one with each of a pair of servo cylinders operably connected to a swash plate of the pump and acting in opposition for positioning of the swash plate. The pressure limiter valves each control the communication of a servo cylinder with either system pressure or drain and are remotely operable to set a displacement of the pump and limit the pressure of the fluid delivered by the pump. This structure enables setting of pump displacement without the use of a displacement control valve associated with the servo cylinders.

6 Claims, 1 Drawing Sheet

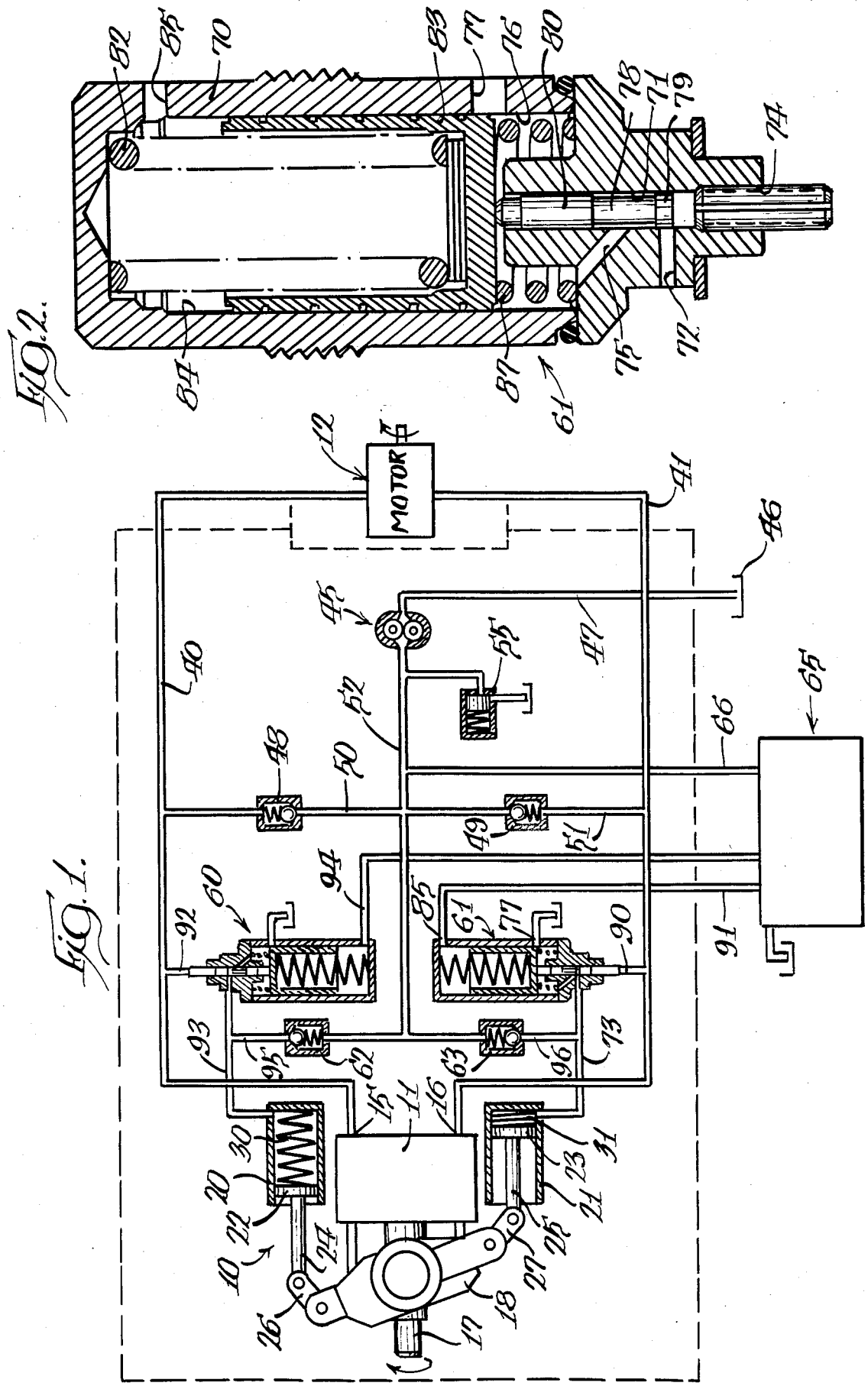

VARIABLE PRESSURE CONTROL

DESCRIPTION

1. Technical Field

This invention pertains to a variable pressure control for a variable displacement over-center pump having servo cylinders associated with a swash plate of the pump which utilizes a pair of three-way variable pressure limiter valves for alternate connection of a servo cylinder to either system pressure or drain whereby remotely set control pressures affect the operation of the variable pressure limiter valves to set pump displacement and to limit the pressure of fluid delivered by the pump. The invention further pertains to a method of controlling pump displacement and limiting operating pressure as well as a new and improved variable pressure limiter valve used in the control.

2. Background Art

It is well known in the art to utilize a variable pressure control for limiting the pressure of fluid delivered by a pump. Such controls have included a pair of pressure-responsive valves responsive to system pressure and in communication one with each of a pair of fluid lines connecting the pump to a motor. Each of these valves is operable upon an increase in system pressure beyond a predetermined value as determined by the setting of the valves to connect system pressure with a servo cylinder associated with the swash plate of the pump to effect a reduction in pump displacement. It is also known to use a remotely-established fluid pressure to set the value at which a valve will open in response to system pressure and with opening of the valve directing system pressure to a servo cylinder to reduce pump displacement. The prior art does not disclose a variable pressure control utilizing three-way valves controlling the communication of the servo cylinders with either system pressure or drain with resulting elimination, or reduction, of orificing of the servo cylinders to each other or orificing of a servo cylinder to drain.

DISCLOSURE OF THE INVENTION

A primary feature of the invention is to provide a variable pressure control which is remotely operable for establishing pump displacement and setting the pressure limit in the system, which improves dynamic response with reduction or elimination of horsepower loss and which modulates pump pressure at a value which is remotely set.

More particularly, the invention relates to a variable pressure control having a pair of three-way pressure limiter valves which can be remotely set and which are associated one with each of a pair of servo cylinders connected to the swash plate of a pump which act in opposition for setting pump displacement. The three-way pressure limiter valves are urged toward a closed position in opposition to system pressure and each controls the communication of an associated servo cylinder with either system pressure or drain. These valves are normally open when charge pressure exists within the fluid lines interconnecting a pump and a motor with charge pressure being applied to the servo cylinders to maintain the pump in a neutral position, Application of a remotely-set control pressure to one of the pressure limiter valves acts to block system pressure from the associated servo cylinder and connect the servo cylinder to drain whereby system pressure acting on the other servo cylinder moves the pump swash plate from neutral position to set pup displacement.

Pressure established by the pump is then modulated under control of the previously controlled pressure limiter valve which will open when system pressure exceeds a predetermined value to redirect system pressure to the associated servo cylinder and modulate the displacement of the pump.

Each of the pressure limiter three-way valves has a valve member for controlling communication of a servo port connected to the servo cylinder with either a pressure port communicating with system pressure or a drain port. Spring means urge the valve member to a position to connect the servo port with drain and with the force set by the spring means being such as to be overcome by charge pressure in the system whereby charge pressure is delivered to both of the servo cylinders. The three-way valves include selectively variable force means urging the valve member to a position to block system pressure from the servo cylinder. The valve has a cylinder having a movable piston which is operatively associated with the valve member and engaged by the spring means and with a control pressure port in the cylinder positioned to enable a remotely-set control pressure to act on the piston with a force additive to that of the spring means.

A further feature of the invention is to provide a method of remotely controlling displacement of a variable displacement over-center pump without the use of a displacement control valve and, further, to limit the pressure delivered by the pump. A pair of servo cylinders which selectively communicate one with each of a pair of fluid lines interconnecting a pump and a motor are supplied with charge pressure to establish a neutral position of the swash plate of the pump and when the pump swash plate is to be moved from neutral position, the charge pressure is blocked from one servo cylinder while simultaneously connecting that servo cylinder to drain whereby the other servo cylinder is still supplied with charge pressure to adjust the swash plate. The limiting of pressure in the system is achieved by communicating pressure from one of the fluid lines to the servo cylinder which had been previously blocked from communication with that fluid line in order to have pump pressure modulated and with the value of system pressure which will act upon the servo cylinder being variable under remote control.

BRIEF DESCRIPTION OF THE DRAWINGS

FIG. 1 is a schematic drawing of a hydrostatic transmission having a pump connected in closed circuit with a motor and which embodies the variable pressure control; and FIG. 2 is a central vertical section of a three-way pressure limiter valve utilized in the variable pressure control.

BEST MODE FOR CARRYING OUT THE INVENTION

The variable pressure control is shown in FIG. 1 in association with a pump, indicated generally at 10, which, with a fluid motor, indicated generally at 12, forms a hydrostatic transmission. The pump 10 is a variable displacement over-center pump and, as an example thereof, may be an axial piston pump having a case 11 with a pair of ports 15 and 16 and with there being a plurality of axially extending pistons mounted for rotation in the case under the drive of an input shaft 17. Displacement of the pump is controlled by a movable swash plate 18 having a neutral position and maximum displacement positions to either side of neutral, with one of the maximum displacement positions being shown in FIG. 1. The swash plate determines the length of stroke of the pistons and, thus, the displacement of the pump.

A pair of servo cylinders 20 and 21 are provided for positioning control of the swash plate, with each of the servo cylinders having the respective pistons 22 and 23 which are connected to the swash plate through the piston rods 24 and 25 and pivoted connecting links 26 and 27, respectively.

Each of the servo cylinders has a spring 30 and 31, respectively, which, in the absence of fluid pressure, cause the swash plate to maintain a neutral position. As is evident, the servo cylinders act in opposition to each other for control of the position of the swash plate. This pump structure and servo cylinder structure for positioning of the swash plate is well known in the art.

The motor 12 is connected in a closed loop with the pump by a pair of fluid lines, with one fluid line 40 connecting the pump port 15 with one side of the motor and a second fluid line 41 connecting the opposite side of the motor with the pump port 16. In such a hydrostatic transmission, it is conventional to have a charge pump, indicated generally at 45, which is connected to a source 46 of fluid by a line 47 and which operates to provide make-up fluid to the closed loop of the hydrostatic transmission through one or the other of a pair of check valves 48 and 49 which are in lines 50 and 51, respectively, connected to a line 52 extending from the outlet of the charge pump 45. A relief valve 55 sets the maximum value of the charge pressure.

The foregoing describes a conventional hydrostatic transmission and there may be additional circuitry therewith which is not shown.

The variable pressure control comprises a pair of remotely-variable three-way pressure limiter valves, indicated generally at 60 and 61, with the valve 61 being shown particularly in FIG. 2. The control additionally includes a pair of check valves 62 and 63 and a regulated pressure source, indicated generally at 65, which is supplied with fluid from the charge pump through a line 66 extending to the charge pump outlet line 52.

Referring particularly to FIG. 2, the variable pressure limiter three-way valve 61 has a valve body 70 provided with a bore 71. A number of ports communicate with the valve bore 71. These ports include a servo port 72 which connects, by a line 73, to the servo cylinder 21. Additionally, there is a pressure-sensing port 74 and a drain port 75, with the latter opening into a chamber 76 in the valve body which communicates with an opening 77 in the valve body for connection to case drain of the pump.

A valve member 78 is movable within the valve bore 71 and has a land 79 which controls communication of the servo port 72 with either the pressure-sensing port 74 or the drain port 75. A second land 80 blocks communication of the valve bore with the chamber 76 within the valve body Variable force means act on the valve member 78, with this means including spring means in the form of a spring 82 acting on a cup-shaped piston 83 which is movable within a cylinder section 84 of the valve body and which, at its lower end as seen in FIG. 2, engages against an end of the valve member 78. A control pressure port 85, through the wall of the valve body, communicates with the interior of the cylinder 84 whereby control pressure may be applied to one side of the piston to add to the force exerted by the spring 82. A small return spring 87 in the chamber 76 acts on the piston to cause the piston to react directly against the spring 82. The pressure-sensing port is connected to the system fluid line 41 through a connecting line 90. The control pressure port 85 is connected to the regulated pressure source 65 through a line 91.

Each of the pressure limiter three-way valves 60 and 61 is of the same construction. The pressure limiter three-way valve 60 has its pressure-sensing port connected to the system fluid line 40 through a connecting line 92 and its servo port connected to the servo cylinder 20 through a line 93. The control pressure port is connected to the source 65 of regulated pressure through a line 94.

Assuming the pump swash plate 18 is in a neutral position and the charge pump is operating, each of the servo cylinders 20 and 21 is connected to charge pressure, since the springs 82 of the pressure limiter valves 60 and 61 are selected to enable charge pressure to act on the valve member 78 and position the land 79 whereby the pressure-sensing port 74 is in communication with the servo port 72. This results in a balance of opposing forces acting to position the swash plate. If a pressure higher than charge pressure occurs in either of the fluid lines 40 and 41, this will act on the associated servo cylinder to adjust the position of the swash plate to move in a manner to reduce the high pressure, thereby maintaining a zero pressure drop across the pump outlet ports 15 and 16. For example, if a higher pressure should exist in the system fluid line 41, this pressure will pass to the servo cylinder 21 to cause a shift in the position of the swash plate 18.

To develop and regulate a higher pressure in one of the pump ports, as for example, the pump port 16, the regulated pressure source 65 is operated, as by operation of a valve contained therein, to deliver a control pressure through line 91 to the control pressure port 85 whereby the force acting on the piston 83 is increased. This control pressure is variable and, thus, the value of maximum system pressure can be varied. This acts to close off the servo port 72 from system pressure and connects the servo port to the drain port 75 whereby the servo cylinder 21 is connected to drain. Servo cylinder 20 is still connected to pressure in the system fluid line 40 through the pressure limiter valve 60, with the result that the control servo cylinder 20 acts to stroke the pump by movement of the swash plate 18 and, thus, develop pressure in pump port 16. As the pressure in system fluid line 41 which is connected to pump port 16 increases, a predetermined value is reached wherein the pressure balances the force established by the spring 82 and the control pressure acting on the piston 83 whereby the valve member shifts to connect the pressure-sensing port 74 to the servo port 72 while closing the connection of the latter to the drain port 75. Thus, system pressure is directed to the servo cylinder 21 in order to modulate pressure in pump port 16 proportional to the control pressure derived from the regulated pressure source 65.

It will be evident from the foregoing that pump port 15 can be the pressure port by delivering control pressure from the regulated pressure source 65 through line 94 to the pressure limiter valve 60 wherein an action occurs similar to that described in connection with the pressure limiter valve 61.

The check valve 62 is connected by a line 95 to the connecting line 93 with servo cylinder 20 and the check valve 63 is connected by a line 96 to the connecting line 73 extending to the servo cylinder 21 with the downstream sides of these check valves being connected to the charge pump outlet line 52. These check valves are connected to the servo cylinders and operate to protect them from being subject to pressures which are excessively higher than charge pressure.

With the foregoing variable pressure control, system pressure overshoot is reduced because high pressure system fluid is used to adjust the position of the swash plate with resulting fast response to over-pressure conditions. The use of two variable pressure limiter valves eliminates or reduces undershoot significantly when an operator removes the control pressure command derived from the regulated pressure source on one of the valves to return the pump to neutral. No dead band exists, since the pressure limiter valve, which has not been subject to a control pressure signal from the regulated pressure source, is set at neutral before the change in operator command. Additionally, the use of pressure limiter three-way valves reduces or eliminates horsepower loss derived from previous controls in which the servo cylinders were either cross-connected through orificing or directly orificed to drain.

From the foregoing description, it will be evident that the displacement of a variable displacement over-center pump is remotely controlled without the use of a displacement control valve by directing a control command to one or the other of a pair of pressure limiter three-way valves, with the commanded valve functioning to simultaneously block system pressure from one servo cylinder of the pump and, at the same time, connect that servo cylinder to drain, with the other servo cylinder acting under modulated system pressure to adjust the swash plate. Additionally, the system pressure is limited by the action of system pressure on the pressure limiter valves, with the pressure limit being variable by setting of the value of the control pressure acting on one of the pressure limiter valves.

The regulated pressure source 65 can set a variable control pressure as previously described. The control pressure operates to cause movement of the pump swash plate 18 to whatever displacement position is required to set system pressure at the value determined by the value of the control pressure. Therefore, there is a primary control for system pressure which also has a pressure limiting function.

I claim:

1. In a closed loop motor and pump system, a method of remotely controlling displacement of the pump which is a variable displacement over-center pump including limiting the pressure delivered thereby, said pump having a pair of ports either of which may selectively deliver fluid at system pressure and which are connectable in a closed loop with the motor by a pair of fluid lines, said pump having a pair of servo cylinders connected one to each of said fluid lines and to a pump swash plate and operable in opposition to each other, and a charge pump for supplying charge pressure to said lines and in communication with said servo cylinders when the pump is in neutral, said method comprising, the steps of simultaneously blocking the application of pressure in the associated fluid line to one servo cylinder and connecting said one servo cylinder to drain with the other servo cylinder acting under the pressure in the fluid line associated with said other servo cylinder to adjust the swash plate and increase the pressure in the fluid line associated with said one servo cylinder, and communicating pressure in said last-mentioned fluid line with said one servo cylinder when said pressure reaches a predetermined value to have said pressure act on said one servo cylinder to modulate the pressure in said last-mentioned fluid line.

2. The method of claim 1 including the step of varying the value of the pressure at which the pressure will act on said one servo cylinder.

3. The combination of a closed loop pump and motor system and a variable pressure control for controlling displacement of the pump which is of the variable displacement over-center type and has a pair of pump ports either of which may selectively deliver fluid at system pressure and which are connectable in a closed lop with the motor by a pair of fluid lines; means for supplying charge pressure to said lines; a pair of servo cylinders connected to a pump swash plate and operable in opposition to each other; a pair of control values associated one with each servo cylinder and each having a plurality of ports connectable with case drain, a respective servo cylinder, and a direct connection with a respective pump port and having a valve member positionable to place the servo cylinder in fluid communication with either the case drain or the pump port; means responsive to system pressure for moving the valve member in a direction to connect the servo cylinder to the pump port; and selectively variable force means acting in opposition to system pressure and operable alternatively to urge one or the other of the valve members in a direction to connect one of the servo cylinders to case drain, said last-mentioned means comprising spring means for biasing the valve members to close off communication between the servo cylinders and the pump ports and overcome when system pressure is equal to charge pressure to position the valve members to have the servo cylinders connected to the pump port.

4. A variable pressure control as defined in claim 3 wherein said selectively variable force means additionally includes a cylinder and a piston urged by said spring means, and means for directing a control pressure into said cylinder to act on said piston to provide a force in addition to said spring means.

5. A variable pressure control as defined in claim 3 wherein each of said control valves has a valve body with a bore; a servo port in said body communicating with said bore and one of the servo cylinders; a pressure-sensing port connected to one of the fluid lines and a fluid discharge port both communicating with said bore at opposite sides of said servo port; said valve member being movable in said bore and having one end exposed to said pressure-sensing port and a land operable to control communication between the servo port and either of the pressure-sensing port and the fluid discharge port; and said variable force means acting on said valve member in opposition to a force derived from fluid pressure at the pressure-sensing port comprising a cylinder, a piston operatively associated with the valve member, and said spring means urging the piston toward the valve member, and a control pressure port in said cylinder for directing a remotely set control pressure to act on said piston with a force additive to that of said spring means.

6. The combination of a closed loop pump and motor system and a variable pressure control for controlling displacement of the pump which is of the variable displacement over-center type having a pair of ports either of which may selectively deliver fluid at system pressure and which are connected in a closed loop with the motor by a pair of fluid lines; means for supplying charge pressure to said fluid lines; a pair of servo cylinders connected to a swash plate of the pump and operable in opposition to each other; a pair of control valves each of said control valves having a valve body with a bore, a servo port in said body communicating with said bore and one of the servo cylinders, a pressure-sensing port connected to one of the fluid lines and a fluid discharge port both communicating with said bore at opposite sides of said servo port; said valve member being movable in said bore and having one end exposed to said pressure-sensing port and a land operable to control communication between the servo port and either of the pressure-sensing port and the fluid discharge port; means responsive to system pressure for moving the valve member in a direction to connect the servo port to the pressure-sensing port; and selectively variably force means acting on said valve member in opposition to a force derived from fluid pressure at the pressure-sensing port comprising a cylinder, a piston operatively associated with the valve member, and spring means urging the piston toward the valve member, said spring means exerting a force less than that generated by charge pressure acting on said end of the valve member to position the valve member with the pressure-sensing port connected to the servo port, a control pressure port in said cylinder, and a variable control pressure source separately connected to the control pressure ports of said pair of control valves for directing a remotely set control pressure to one or the other of the control valves to act on the control valve piston with a force additive to that of said spring means.

* * * * *